(12) United States Patent
Ishikawa et al.

(10) Patent No.: US 6,896,093 B2
(45) Date of Patent: May 24, 2005

(54) INTEGRAL POWER STEERING APPARATUS

(75) Inventors: Shogo Ishikawa, Saitama (JP); Hideki Takahashi, Saitama (JP)

(73) Assignee: Unisia JKC Steering Systems Co., Ltd., Atsugi (JP)

( * ) Notice: Subject to any disclaimer, the term of this patent is extended or adjusted under 35 U.S.C. 154(b) by 0 days.

(21) Appl. No.: 10/861,428

(22) Filed: Jun. 7, 2004

(65) Prior Publication Data
US 2004/0251075 A1 Dec. 16, 2004

(30) Foreign Application Priority Data

Jun. 9, 2003 (JP) ........................................ 2003-163864
Apr. 14, 2004 (JP) ........................................ 2004-119064

(51) Int. Cl.[7] ................................................. B62D 5/06
(52) U.S. Cl. ........................ 180/417; 180/433; 180/439; 180/441; 91/374
(58) Field of Search ................................. 180/417, 421, 180/432, 433, 434, 439, 441, 442; 91/374, 375 A

(56) References Cited

U.S. PATENT DOCUMENTS

| | | | | |
|---|---|---|---|---|
| 5,660,247 A | * | 8/1997 | Lang ........................... | 180/421 |
| 6,230,839 B1 | * | 5/2001 | Elser et al. ................... | 180/417 |
| 6,408,975 B1 | * | 6/2002 | Bishop et al. ............... | 180/422 |
| 6,779,625 B2 | * | 8/2004 | Sonoda et al. .............. | 180/422 |
| 6,782,966 B2 | * | 8/2004 | Sahr et al. ................... | 180/428 |
| 2003/0013442 A1 | * | 1/2003 | Holmes et al. .............. | 455/426 |
| 2003/0141140 A1 | * | 7/2003 | Wienecke .................... | 180/441 |

FOREIGN PATENT DOCUMENTS

JP        2518888 Y2        9/1996

* cited by examiner

Primary Examiner—Avraham Lerner
(74) Attorney, Agent, or Firm—Foley & Lardner LLP

(57) ABSTRACT

An integral power steering apparatus includes a stroke limiter. A piston defines two hydraulic chambers in a housing. A communicating passage, a first valve disposed between the first hydraulic chamber and the communicating passage, and a second valve disposed between the second hydraulic chamber and the communicating passage, are provided to serve for a stroke limiter, in addition to a hydraulic circuit for supplying hydraulic fluid to the two hydraulic chambers. The two valves each include a valve body having a bore and serving as a valve seat, a plunger slidably fitted within the bore of the valve body and serving as a valving element, and a spring disposed on the bottom of the bore of the valve body and biasing the plunger to be in contact with the valve body.

17 Claims, 3 Drawing Sheets

INTEGRAL POWER STEERING APPARATUS

BACKGROUND OF THE INVENTION

The present invention relates generally to integral power steering apparatuses, and more particularly to an integral power steering apparatus including a stroke limiter for limiting the stroke of a piston thereof.

In general, an integral power steering apparatus includes a hydraulic cylinder, and a piston slidably fitted within the hydraulic cylinder. The piston and a piston seal attached to the outer peripheral wall of the piston divides the inner space of the hydraulic cylinder, to define two hydraulic chambers. A control valve directs and supplies hydraulic fluid to each of the two hydraulic chambers. The difference between the pressures in the hydraulic chambers applies force to the piston to travel and thereby produces assist torque in a steering direction. Some integral power steering apparatuses include a stroke limiter, which relieves steering assist torque during steer angle being out of a desired steer angle range, to prevent a steering linkage assembly to be imposed with great load. Some stroke limiters relieve pressurized hydraulic fluid from one of the hydraulic chambers to the other hydraulic chamber via a check valve provided inside the piston. However, pistons for power steering systems are carburized in general. Therefore, providing a check valve within a piston needs machining after carburization. In addition, locating a check valve within a piston is under considerable constraints, especially under the constraint on angular position in the outer peripheral wall of the piston. Furthermore, a power steering apparatus with a stroke limiter and a power steering apparatus with no stroke limiter include different elements, which results in cost-up in management of parts. Accordingly, an integral power steering apparatus in which internal parts such as a piston are employed with no change from those of an integral steering apparatus with no stroke limiter is disclosed in Japanese Utility Model Registration No. 2518888 (hereinafter referred to as "JP2518888"), especially in pages 2 through 3, and FIG. 1 therein. The integral power steering apparatus disclosed in JP2518888 includes a hydraulic cylinder, a piston slidably fitted within the cylinder, a rack defined in the side wall of the piston, a sector gear meshed with the rack, a piston seal attached to the piston, the piston and the piston seal defining two hydraulic chambers, a control valve, a gear chamber being in fluid communication with one of the hydraulic chambers and accommodating the sector gear, and two valves provided in the wall of the gear chamber on both sides of the sector gear. In this structure, the state of the control valve is varied according to operations of steering wheel, to supply hydraulic pressure generated by an oil pump to one of the hydraulic chambers and to communicate the other hydraulic chamber and an oil reservoir at the same time, so that the difference between the pressures in the hydraulic chambers applies force to the piston to travel and thereby produces assist torque in a steered direction. One of the valves is disposed between the gear chamber and the hydraulic chamber in fluid communication with the gear chamber, and the other valve is disposed between the gear chamber and the oil pump. One of the valves is opened during the angular displacement of the sector gear being greater than a predetermined threshold angle in each direction.

SUMMARY OF THE INVENTION

In the integral power steering apparatus disclosed in JP2518888, the two valves serving for a stroke limiter are both located in the wall of the steering body. There is no need for additional machining of the piston. Therefore, such an integral power steering apparatus is preferable in terms of sharing components with an integral power steering apparatus with no stroke limiter, relative to an integral power steering apparatus with a stroke limiter inside a piston. However, an intricate spool valve is necessary for communicating the two hydraulic chambers, since the system has a structure where the valves are both located in the gear chamber.

Accordingly, it is an object of the present invention to provide an integral power steering apparatus with a stroke limiter having a simple and adaptable structure.

In order to accomplish the aforementioned and other objects of the present invention, an integral power steering apparatus comprising a housing, an input shaft for being connected to a steering wheel for rotation therewith, a piston mounted in the housing for longitudinal motion and defining a pair of hydraulic chambers including a first hydraulic chamber and a second hydraulic chamber in cooperation with the housing, a first motion transmission mechanism coupling the input shaft and the piston for transmission between rotary motion of the input shaft and longitudinal motion of the piston, a control valve disposed between a hydraulic pressure source and the pair of hydraulic chambers for variably regulating fluid flow to each of the first hydraulic chamber and the second hydraulic chamber, a second motion transmission mechanism coupling the piston and a steerable wheel for transmission between longitudinal motion of the piston and swinging motion of the steerable wheel, a communicating passage, a first valve disposed between the first hydraulic chamber and the communicating passage for fluid communication therebetween during hydraulic pressure in the first hydraulic chamber being greater than or equal to a predetermined threshold pressure and during displacement of the piston being greater than or equal to a predetermined threshold distance in a direction to decrease volumetric capacity of the first hydraulic chamber, and a second valve disposed between the second hydraulic chamber and the communicating passage for fluid communication therebetween during hydraulic pressure in the second hydraulic chamber being greater than or equal to a predetermined threshold pressure and during displacement of the piston being greater than or equal to a predetermined threshold distance in a direction to decrease volumetric capacity of the second hydraulic chamber.

According to another aspect of the invention, an integral power steering apparatus comprising a housing, an input shaft for being connected to a steering wheel for rotation therewith, a worm shaft, a torsion bar coupling the input shaft and the worm shaft, a piston disposed for longitudinal motion between the worm shaft and a wall of the housing and defining a pair of hydraulic chambers including a first hydraulic chamber and a second hydraulic chamber in cooperation with the housing, the second hydraulic chamber being on one side of the piston and closer to the input shaft, and the first hydraulic chamber being on the other side of the piston, a recirculating-ball mechanism coupling the worm shaft and the piston for conversion between rotary motion of the worm shaft and longitudinal motion of the piston, a pair of fluid passages including a first fluid passage in fluid communication with the first hydraulic chamber and a second fluid passage in fluid communication with the second hydraulic chamber, a control valve disposed between a hydraulic pressure source and the pair of fluid passages for variably regulating fluid flow to each of the first fluid passage and the second fluid passage in accordance with torsion of the torsion bar defined by relative angular displacement between the input shaft and the worm shaft, a second motion transmission mechanism coupling the piston and a steerable wheel for transmission between longitudinal motion of the piston and swinging motion of the steerable wheel, a communicating passage, a first valve disposed between the first hydraulic chamber and the communicating passage for fluid communication therebetween during hydraulic pressure in the first hydraulic chamber being greater than or equal to a predetermined threshold pressure and during displacement of the piston being greater than or equal to a predetermined threshold distance in a direction to decrease volumetric capacity of the first hydraulic chamber, and a second valve disposed between the second hydraulic chamber and the communicating passage for fluid communication therebetween during hydraulic pressure in the second hydraulic chamber being greater than or equal to a predetermined threshold pressure and during displacement of the piston being greater than or equal to a predetermined threshold distance in a direction to decrease volumetric capacity of the second hydraulic chamber.

According to a further aspect of the invention, an integral power steering apparatus comprising a housing, input means for rotating with a steering wheel, division means for longitudinally moving in the housing and defining a pair of hydraulic chambers including a first hydraulic chamber and a second hydraulic chamber in cooperation with the housing, first motion transmission means for transmitting between rotary motion of the input means and longitudinal motion of the division means, pressure control means for variably regulating hydraulic pressure in each of the first hydraulic chamber and the second hydraulic chamber, second motion transmission means for transmitting between longitudinal motion of the division means and swinging motion of a steerable wheel, communicating means for providing fluid communication, first valving means for providing fluid communication between the first hydraulic chamber and the communicating means during hydraulic pressure in the first hydraulic chamber being greater than or equal to a predetermined threshold pressure and during displacement of the piston being greater than or equal to a predetermined threshold distance in a direction to decrease volumetric capacity of the first hydraulic chamber, and second valving means for fluid communication between the second hydraulic chamber and the communicating means during hydraulic pressure in the second hydraulic chamber being greater than or equal to a predetermined threshold pressure and during displacement of the piston being greater than or equal to a predetermined threshold distance in a direction to decrease volumetric capacity of the second hydraulic chamber.

The above objects and other objects, features, and advantages of the present invention are readily apparent from the following detailed description of the best modes for carrying out the invention when taken in connection with the accompanying drawings.

DETAILED DESCRIPTION OF THE INVENTION

Figure 1:
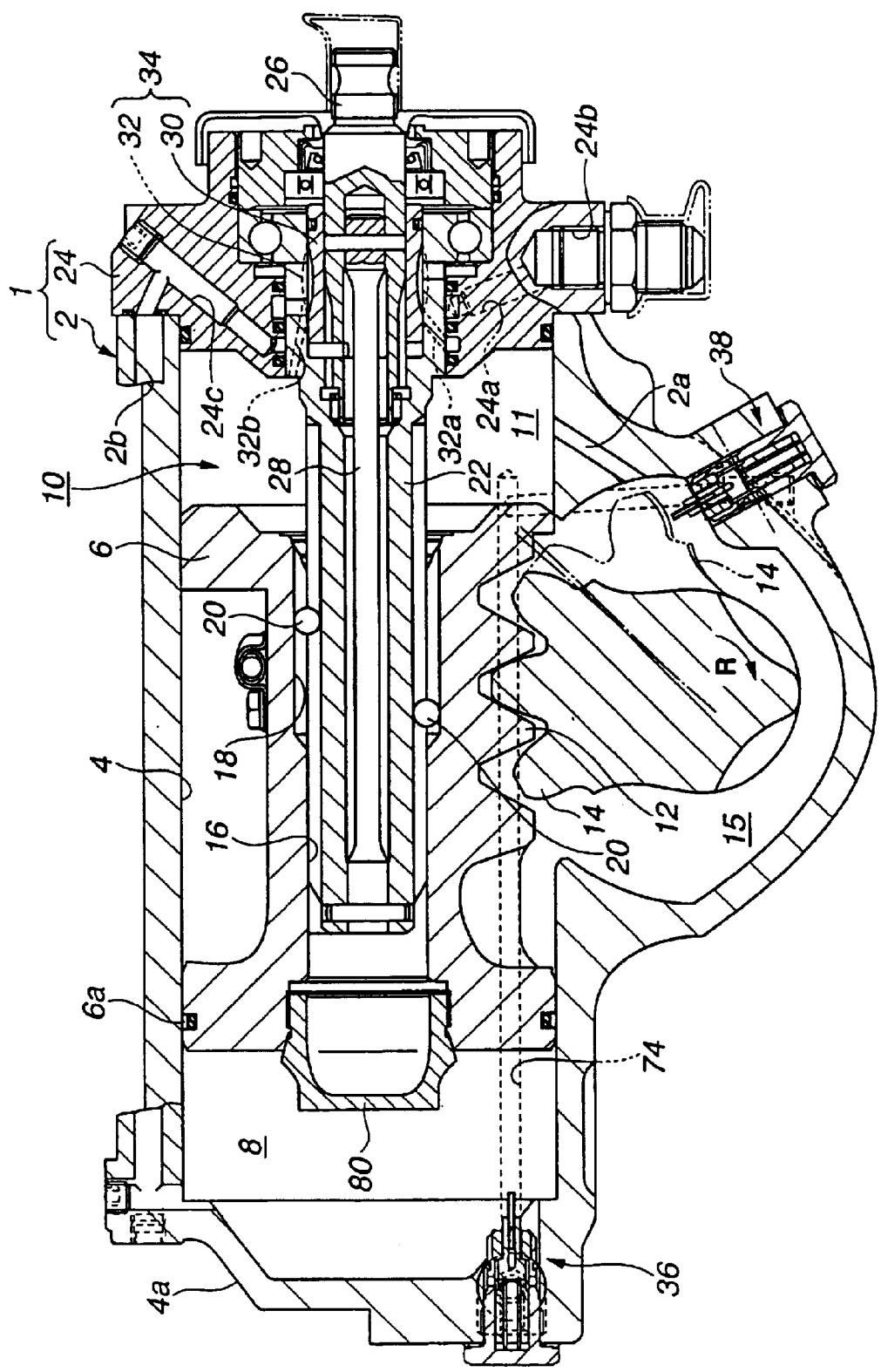
FIG. 1 is a side sectional view of an integral power steering apparatus in accordance with a first embodiment of the present invention.

Referring now to FIG. 1, there is shown an integral power steering apparatus with a stroke limiter in accordance with a first embodiment of the present invention. The integral power steering apparatus includes a housing such as a housing assembly 1. Housing assembly 1 consists of a steering housing 2 and a valve housing 24. Steering housing 2 includes a cylinder section 4 of a tubular cylindrical shape having one longitudinal end connected to or blocked with valve housing 24 and the other longitudinal end blocked with a bottom section 4a, and a gear chamber 15 formed in the peripheral wall of cylinder section 4. A piston such as a power piston 6 is mounted in housing assembly 1 for longitudinal motion. That is, power piston 6 is slidably fitted within cylinder section 4 of steering housing 2 for linear or reciprocating motion in housing assembly 1. A piston seal 6a is fitted within a groove formed in a flange of power piston 6 or in an end portion of the outer peripheral wall of power piston 6 close to bottom section 4a. Power piston 6 and piston seal 6a divide the inner space of cylinder section 4 into two parts, that is, define a pair of hydraulic chambers including a first hydraulic chamber 8 at the left facing bottom section 4a and a second hydraulic chamber 10 at the right facing valve housing 24 in FIG. 1. A piston rack 12 is coupled to or formed in a longitudinal middle portion of the side wall of power piston 6 (the lower side of power piston 6 in FIG. 1) for motion therewith and extending along the longitudinal axis of power piston 6 and facing gear chamber 15. On the other hand, a sector gear 14, which is associated or engaged with steerable wheels (not shown), is housed in gear chamber 15. Sector gear 14 having a rotational axis perpendicular to the longitudinal axis of power piston 6 is meshed with piston rack 12, so that sector gear 14 takes rotary or swinging motion according to linear or longitudinal motion of power piston 6. That is, piston rack 12 and sector gear 14 serve for a second motion transmission mechanism coupling power piston 6 and the steerable wheels for conversion and transmission between linear motion in the longitudinal direction of power piston 6 and the steerable wheels. Second hydraulic chamber 10 of steering housing 2 includes a piston-side partial hydraulic chamber 11 defined by power piston 6, the side wall of cylinder section 4, and valve housing 24, and gear chamber 15 accommodating sector gear 14 and hydraulically connected to piston-side partial hydraulic chamber 11 via fluid passage 2a.

Power piston 6 includes a portion defining a bore 16 extending in the longitudinal direction thereof and closed at one end to first hydraulic chamber 8 by a cap 80. A ball-guiding thread groove 18 is formed in the side wall of bore 16. Similarly, a worm shaft 22 includes a portion defining a ball-guiding thread groove in the outer peripheral wall thereof. Worm shaft 22 is screwed into bore 16 of power piston 6 via pluralities of recirculating balls 20 in ball-guiding thread groove 18. An input shaft such as a stub shaft 26, which is connected to or associated with a steering wheel (not shown) for rotation therewith and has the same axis of worm shaft 22, is inserted into a through hole of is valve housing 24. Worm shaft 22 includes a larger-diameter tubular shape at the end portion close to stub shaft 26. Stub shaft 26 is fitted into the bore of worm shaft 22. Stub shaft 26 includes a portion defining a bore extending in the longitudinal direction thereof and being open at one end close to worm shaft 22. Worm shaft 22 and stub shaft 26 are coupled with a torsion bar 28 that is inserted and fitted into both the bores of worm shaft 22 and stub shaft 26. Thus, a recirculating-ball mechanism including worm shaft 22, recirculating balls 20, and ball-guiding thread groove 18 serves for a first motion transmitting mechanism coupling stub shaft 26 and power piston 6 for converting and transmitting between rotary motion of stub shaft 26 and longitudinal motion of power piston 6.

Valve housing 24 accommodates a control valve 34 of the rotary type. Control valve 34 is disposed between a hydraulic pressure source and the pair of hydraulic chambers 8, 10 for variably regulating fluid flow to each of first hydraulic chamber 8 and second hydraulic chamber 10. Actually, control valve 34 includes a valve rotor 30 rotating solidly with stub shaft 26, and a valve sleeve 32 formed in the end portion of worm shaft 22. The state of control valve 34 is determined in accordance with torsion of torsion bar 28 defined by relative angular displacement between stub shaft 26 and worm shaft 22. Control valve 34 is hydraulically connected to a hydraulic pressure source such as an oil pump (not shown) via a supply passage 24a and an inlet port 24b, and to an oil reservoir (not shown) via a drain passage and an outlet port (not shown). Additionally, control valve 34 is hydraulically connected to first hydraulic chamber 8 via a first fluid passage including fluid passages 32a, 24c, and 2b, and to second hydraulic chamber 10 via a second fluid passage including a fluid passage 32b. Thus, control valve 34 selectively provides or blocks fluid communication between the oil pump and the two hydraulic chambers, and between the oil reservoir and the two hydraulic chambers, so that control valve 34 selectively directs pressurized hydraulic fluid supplied by the oil pump to first hydraulic chamber 8 or second hydraulic chamber 10. With the state of control valve 34 varied or selected by operations of the steering wheel, pressurized fluid discharged by the oil pump is supplied to one of hydraulic chambers 8, 10. At the same time, the other hydraulic chamber is brought in fluid communication with the fluid reservoir. In this manner, the difference between the hydraulic pressures in hydraulic chambers 8, 10 is produced, to apply force to power piston 6 in the longitudinal direction and thereby to provide assist torque for steering operation.

Figure 2:
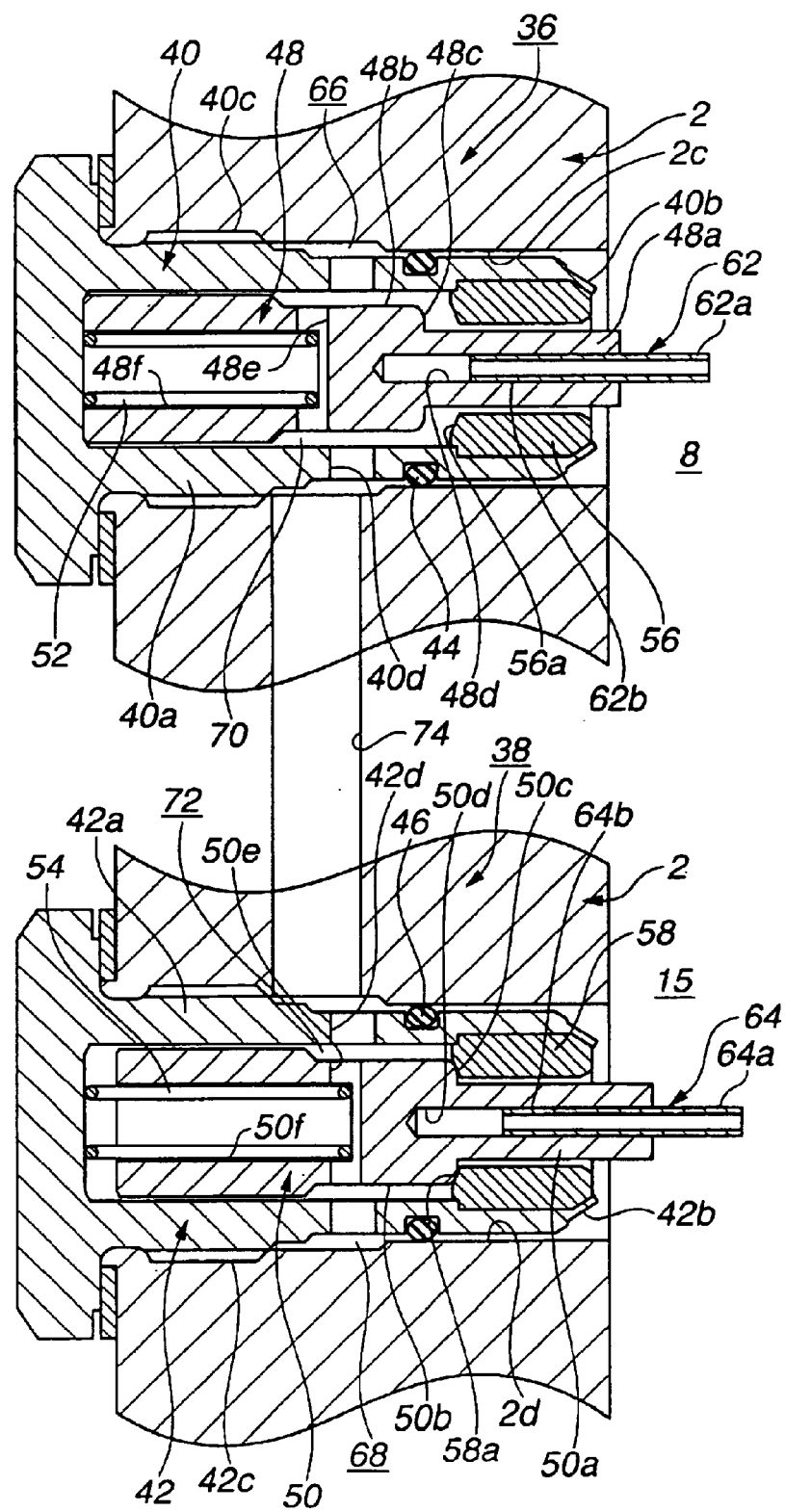
FIG. 2A is an enlarged side sectional view of a first valve in an open state for serving for a stroke limiter of the integral power steering apparatus in accordance with the first embodiment of the present invention.
FIG. 2B is an enlarged side sectional view of a second valve in a closed state for serving for the stroke limiter of the integral power steering apparatus in accordance with the first embodiment of the present invention.

The integral power steering apparatus includes a pair of valves serving for a stroke limiter. A first valve 36 is located in bottom section 4a of cylinder section 4 in a path of linear motion of power piston 6. A second valve 38 is located in a portion of the side wall of gear chamber 15 in a path of swinging motion of sector gear 14. That is, valves 36, 38 are provided in two hydraulic chambers 8, 10 defined by power piston 6 and piston seal 6a. Steering housing 2 includes portions defining through holes 2c, 2d. Through hole 2c is formed in a portion of bottom section 4a close to gear chamber 15 and extending along a direction parallel to the longitudinal axis of power piston 6. Through hole 2d is formed in the peripheral wall of gear chamber 15 and extending toward the path of swinging motion of sector gear 14. Referring now to FIGS. 2A and 2B, there is shown enlarged side sectional views of valves 36, 38. Valves 36, 38 have a same structure. Valve bodies 40, 42 are attached to the wall of steering housing 2, that is, screwed into through holes 2c, 2d from outside steering housing 2. Valve bodies 40, 42 include portions defining bores facing hydraulic chambers 8, 10. In other words, the inserted portions of valve bodies 40, 42, that is, cylinder sections 40a, 42a of valve bodies 40, 42 are formed into tubular shapes open to first hydraulic chamber 8 and gear chamber 15 as a part of second hydraulic chamber 10. O-rings 44, 46 are attached and fitted within grooves formed in the outer peripheral wall of valve bodies 40, 42, to ensure fluid sealing. Plunger main bodies such as plungers 48, 50, which are formed into substantially three-stepped cylindrical shapes, are inserted into and slidably fitted within cylinder sections 40a, 42a of valve bodies 40, 42. Springs 52, 54 are provided on the bottom portions (at the left in FIGS. 2A and 2B) of cylinder sections 40a, 42a of valve bodies 40, 42, to bias plungers 48, 50 toward the openings of valve bodies 40, 42, that is, toward first hydraulic chamber 8 and gear chamber 15. Guide members 56, 58 are fitted with the inner surface of the open end portions of valve bodies 40, 42, to guide linear or reciprocating motion of plungers 48, 50. Opening edges 40b, 42b of valve bodies 40, 42 are swaged to fix guide members 56, 58 to valve bodies 40, 42. Smaller-diameter portions 48a, 50a in the end portions of plungers 48, 50 are in sliding-contact with guide members 56, 58. Plungers 48, 50 and guide members 56, 58 serve for a valve function. Stepped portions 48c, 50c between smaller-diameter portions 48a, 50a and middle-diameter portions 48b, 50b in the longitudinal middle portions of plungers 48, 50 serve as valve elements. End surfaces 56a, 58a of guide members 56, 58 facing the bottoms of cylinder sections 40a, 42a serve as valve seats. Thus, valve portions 48c, 50c of plungers 48, 50 and valve seats 56a, 58a of valve bodies 40, 42 have a state of being in contact with each other for fluid communication and a state of being out of contact with each other for fluid separation between communicating passage 74 and the associated hydraulic chambers. FIG. 2A shows first valve 36 in an open state. FIG. 2B shows second valve 38 in a closed state. With plungers 48, 50 pressed by springs 52, 54, valve portions 48c, 50c are forced to travel to be in contact with valve seats 56a, 58a, which results in closing valves 36, 38.

Smaller-diameter portions 48a, 50a of plungers 48, 50 are formed into tubular cylindrical shapes, that is, include portions defining bores 48d, 50d. Spring pins 62, 64, which have contact portions adapted to be in contact with power piston 6 and sector gear 14, are pressed into and slidably and frictionally fitted within bores 48d, 50d of plungers 48, 50. Spring pins 62, 64 include outside end portions 62a, 64a extending outward from bores 48d, 50d of plungers 48, 50 toward first hydraulic chamber 8 and gear chamber 15, and inside end portions 62b, 64b pressed into bores 48d, 50d of plungers 48, 50. Inside end portions 62b, 64b of spring pins 62, 64 are placed with space left in the bottom portion of bores 48d, 50d, so that spring pins 62, 64 are capable of being forced to travel toward inside. Thread portions 40c, 42c formed in the outer peripheral walls of valve bodies 40, 42 that are screwed into through holes 2c, 2d of steering housing 2, and O-rings 44, 46 define annular spaces 66, 68 therebetween. The inner peripheral walls of cylinder sections 40a, 42a of valve bodies 40, 42, and the outer peripheral walls of middle-diameter portions 48b, 50b of plungers 48, 50 define annular spaces 70, 72 therebetween. Valve bodies 40, 42 include portions defining through holes 40d, 42d extending in the radial direction inside cylinder sections 40a, 42a thereof. Through holes 40d, 42d allow fluid communication between annular spaces 70, 72 inside and annular spaces 66, 68 outside valve bodies 40, 42. Plungers 48, 50 include portions defining radial through holes 48e, 50e extending in the radial direction inside middle-diameter portions 48b, 50b and axial holes 48f, 50f extending in the longitudinal direction from the bottom end to radial through holes 48e, 50e. Springs 52, 54 for biasing plungers 48, 50 toward outside are housed in axial holes 48f, 50f, having one ends attached to the bottom portion of valve bodies 40, 42 and the other ends attached to the end of axial holes 48f, 50f. Steering housing 2 include portions defining a communicating passage 74 disposed and hydraulically connected for fluid communication between first valve 36 and second valve 38. Communicating passage 74 has openings in the side walls of through holes 2c, 2d, facing to annular spaces 66, 68.

In this manner, first valve 36 is disposed between first hydraulic chamber 8 and communicating passage 74 for fluid communication therebetween during hydraulic pressure in first hydraulic chamber 8 being greater than or equal to a predetermined threshold pressure and during displacement of power piston 6 being greater than or equal to a predetermined threshold distance in a direction to decrease volumetric capacity of first hydraulic chamber 8. Second valve 38 is disposed between second hydraulic chamber 10 and communicating passage 74 for fluid communication therebetween during hydraulic pressure in second hydraulic chamber 10 being greater than or equal to a predetermined threshold pressure and during displacement of power piston 6 being greater than or equal to a predetermined threshold distance in a direction to decrease volumetric capacity of second hydraulic chamber 10.

The following describes operations of the previously discussed integral power steering apparatus. In the shown embodiment, in valves 36, 38 serving for a stroke limiter, the positions of spring pins 62, 64 with reference to plungers 48, 50 are automatically adjusted as follows. First, spring pins 62, 64 are pressed into plungers 48, 50 to be in a state where portions of spring pins 62, 64 extending from the openings of bores 48d, 50d of plungers 48, 50 are longer than under normal operating conditions. With spring pins 62, 64 in this state, valve bodies 40, 42 are screwed into through holes 2c, 2d of steering housing 2. Next, with the integral power steering apparatus mounted on an automotive vehicle and the hydraulic system or the engine powered off, the steering wheel is turned to a maximum angle in each direction defined by a link stopper. At this time, power piston 6 and sector gear 14 are forced to travel or rotate to be in contact with spring pins 62, 64, so that plungers 48, 50 of valves 36, 38 are forced to travel toward the bottom portions of valve bodies 40, 42. After plungers 48, 50 are brought in contact with the bottom portions of valve bodies 40, 42, spring pins 62, 64 are further pressed into bores 48d, 50d of plungers 48, 50 until the apparatus are brought into the state defined by the link stopper. Determining the positions of spring pins 62, 64 with reference to plungers 48, 50 in this manner results in adjusting the threshold angle of enabling the stroke limiter to an angle corresponding to a state where power piston 6 or sector gear 14 is on verge of reaching a position defined by a link stopper.

In this embodiment, hydraulic fluid is discharged by the oil pump and directed to one of hydraulic chambers 8, 10, according to the state of control valve 34 varied by operations of the steering wheel. At the same time, the other hydraulic chamber is brought in fluid communication with the fluid reservoir to drain hydraulic fluid thereto. In this manner, the difference between the hydraulic pressures in hydraulic chambers 8, 10 is produced, to apply force to power piston 6 in the longitudinal direction and thereby to provide assist torque for steering operation.

While the integral power steering apparatus with the threshold angle of enabling the stroke limiter adjusted as discussed above is operating under normal conditions, power piston 6 and sector gear 14 are out of contact with spring pins 62, 64 of valves 36, 38. In an associated one of valves 36, 38 facing the hydraulic chamber having a higher hydraulic pressure, for example, first valve 36 facing first hydraulic chamber 8 in the case of right turn, plunger 48 is pressed into valve body 40 against spring 52 by the higher hydraulic pressure in first hydraulic chamber 8, as shown in FIG. 2A. Valve portion 48c of plunger 48 is forced to travel out of contact with valve seat 56a of guide member 56, to open first valve 36. On the other hand, in second valve 38 facing gear chamber 15 as a part of second hydraulic chamber 10 having a lower hydraulic pressure, valve portion 50c of plunger 50 is kept in contact with valve seat 58a of guide member 58 by spring 54. At the same time, the higher hydraulic pressure in first hydraulic chamber 8 is supplied to annular space 68 of second valve 38 via first valve 36 and communicating passage 74. The supplied hydraulic pressure presses valve portion 50c of plunger 50 onto valve seat 58a of guide member 58, resulting in a more reliable fluid sealing, as shown in FIG. 2B.

On the other hand, when a large steering input is imposed on the steering wheel after steer angles reach extremities, for example, in the case of right turn, hydraulic pressure in first hydraulic chamber 8 rises to force power piston 6 to travel to the right and sector gear 14 to rotate clockwise to the position indicated by imaginary lines in FIG. 1. Then, sector gear 14 presses spring pin 64 of second valve 38 facing gear chamber 15, to press plunger 50 to travel to the bottom portion of valve body 42 in the direction opposite to the bias of springs 52, 54. Valve portion 50c of plunger 50 is brought out of contact with valve seat 58a of guide member 58, to open second valve 38. In this state, the higher hydraulic pressure in first hydraulic chamber 8 is supplied to second hydraulic chamber 10 or gear chamber 15 via first valve 36, communicating passage 74, and second valve 38. Thus, the hydraulic pressure in first hydraulic chamber 8 is lowered, to lower assist torque. This prevents damaging the link mechanism of the steering system.

In the case of left turn, hydraulic pressure in second s hydraulic chamber 10 rises to force power piston 6 to travel to the left and sector gear 14 to rotate counter-clockwise. Under normal steering conditions, second valve 38 facing gear chamber 15 is opened, and first valve 36 facing first hydraulic chamber 8 is closed, in a state inverted from the state as shown in FIGS. 2A and 2B. With a large steering input imposed on the steering wheel, power piston 6 presses spring pin 62 of first valve 36 in first hydraulic chamber 8, to press plunger 48 to travel to the bottom portion of valve body 40. Valve portion 48c of plunger 48 is brought out of contact with valve seat 56a of guide member 56, to open first valve 36. In this state, the higher hydraulic pressure in second hydraulic chamber 10 is supplied to first hydraulic chamber 8 via second valve 38, communicating passage 74, and first valve 36. Thus, the hydraulic pressure in second hydraulic chamber 10 is lowered, to lower assist torque. This prevents damaging the link mechanism of the steering system and producing torque on the axis of the sector shaft.

In the shown embodiment, valves 36, 38 have a simple structure, which allows downsizing of valves 36, 38. Changing steering housing 2 and sharing the other elements is enough to provide both an integral power steering apparatus with a stroke limiter and an integral power steering apparatus without a stroke limiter. This reduces a cost-up from an integral power steering apparatus without a stroke limiter to an integral power steering apparatus with a stroke limiter. In valves 36, 38, valve portions 48c, 50c of plungers 48, 50 are pressed onto valve seats 56a, 58a of guide members 56, 58 by springs 52, 54, which prevents leaking of hydraulic fluid.

In addition, in a valve facing one of the hydraulic chambers having a lower hydraulic pressure, a higher hydraulic pressure is imposed on the bottom face of the associated plunger of the valve, which ensures reliable fluid sealing. With the system mounted on an automotive vehicle, the operation of the stroke limiter can be adjusted so that the stroke limiter is operative in a state where a steering wheel angle reaches or is on the verge of reaching the position defined by the link stopper.

In the shown embodiment, valve portions 48c, 50c of plungers 48, 50, which are pressed to be in contact with valve seats 56a, 58a of guide members 56, 58, are flatly formed. This structure is preferable in fluid sealing. Alternatively, valve portions 48c, 50c may be formed into a spherical shape. This structure ensures fluid sealing, even when plungers 48, 50 are inclined.

In the shown embodiment, spring pins 62, 64 are provided for being in contact with power piston 6 and sector gear 14. When there is no need of adjusting relative distances between plungers 48, 50 and power piston 6 or sector gear 14, plungers 48, 50 and spring pins 62, 64 may be formed in one pieces.

Figure 3:
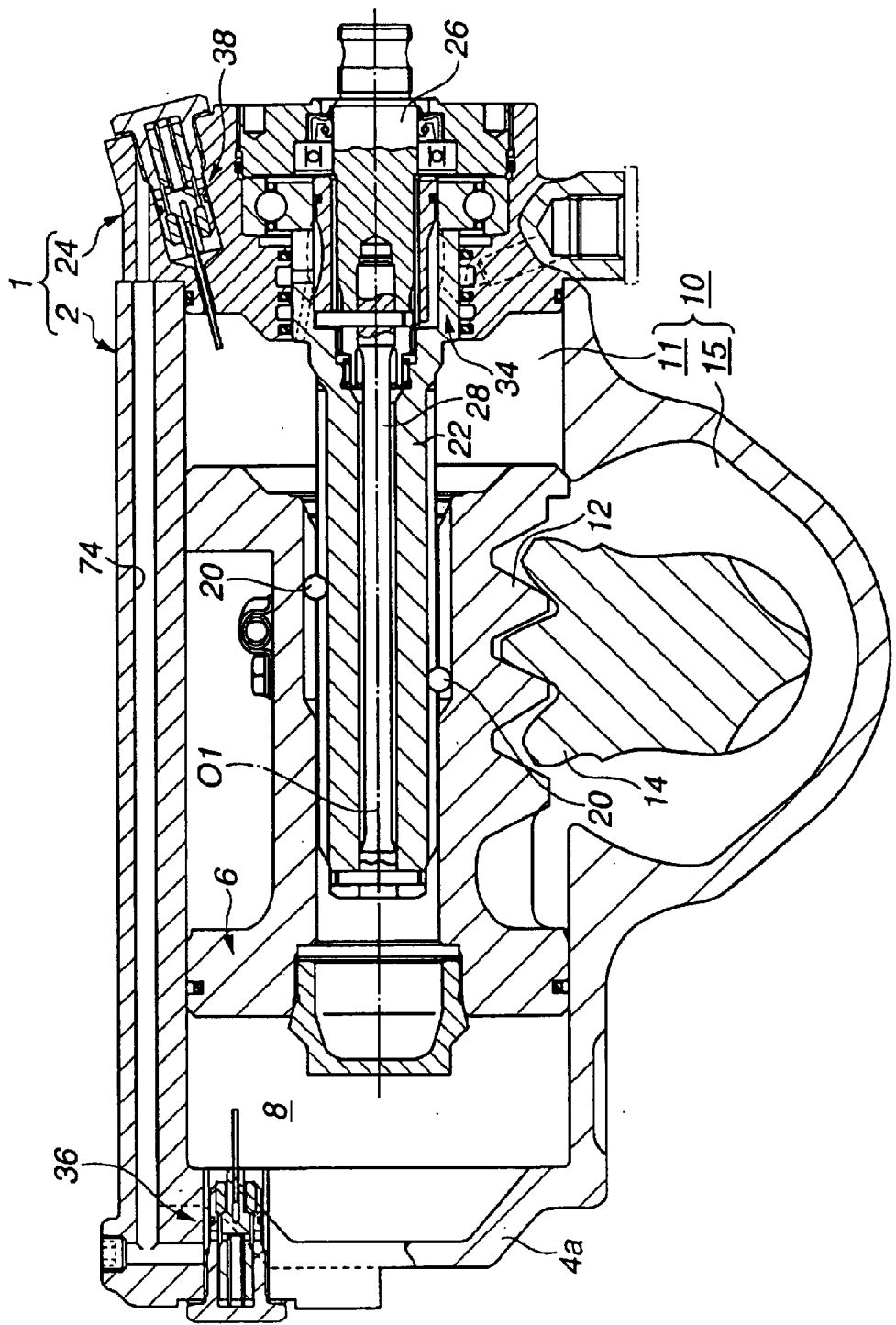
FIG. 3 is a side sectional view of an integral power steering apparatus in accordance with a second embodiment of the present invention.

Referring now to FIG. 3, there is shown an integral power steering apparatus with a stroke limiter in accordance with a second embodiment of the present invention. The integral power steering apparatus includes the same basic structure as in the first embodiment. There are differences in the placement of a pair of valves including first valve 36 and second valve 38 serving for a stroke limiter and accessory changes such as the placement of communicating passage 74. The same elements as in the first embodiment are indicated by the same reference signs. In the second embodiment, first valve 36 is located in bottom section 4a of steering housing 2, as in the case of the first embodiment. Actually, first valve 36 is located in a portion of bottom section 4a far from gear chamber 15. Second valve 38 is located in valve housing 24, and a longitudinal axis inclined with reference to an axis O1 of stub shaft 26 and worm shaft 22, as shown in FIG. 3. Communicating passage 74, which communicates first valve 36 and second valve 38, is formed in steering housing 2 and valve housing 24. The operation of the apparatus is same as in the first embodiment.

In the shown embodiment, second valve 38, which is located in valve housing 24, is inclined. This allows downsizing of valve housing 24 or the whole apparatus. Alternatively, second valve 38 may be placed parallel to axis O1 without inclination, as in the case of first valve 36.

In the shown embodiments, power piston 6 is configured to travel along a straight path within steering housing 2. Alternatively, the path of power piston 6, that is, the shape of cylinder section 4 of steering housing 2 may be formed into another shape such as a part of an annular shape, namely, a curved cylindrical shape, where the longitudinal motion of power piston 6 indicates a rotary motion. In addition, the rotary motion of power piston 6 may have a same axis as the input shaft. In this structure, the first and second motion transmitting mechanisms are configured to serve for rotary-to-rotary motion transmission.

This application is based on a prior Japanese Patent Application No. 2003-163864 filed Jun. 9, 2003, and a prior Japanese Patent Application No. 2004-119064 filed Apr. 14, 2004. The entire contents of these Japanese Patent Applications Nos. 2003-163864 and 2004-119064 are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An integral power steering apparatus comprising:
   a housing;
   an input shaft for being connected to a steering wheel for rotation therewith;
   a piston mounted in the housing for longitudinal motion and defining a pair of hydraulic chambers including a first hydraulic chamber and a second hydraulic chamber in cooperation with the housing;
   a first motion transmission mechanism coupling the input shaft and the piston for transmission between rotary motion of the input shaft and longitudinal motion of the piston;
   a control valve disposed between a hydraulic pressure source and the pair of hydraulic chambers for variably regulating fluid flow to each of the first hydraulic chamber and the second hydraulic chamber;
   a second motion transmission mechanism coupling the piston and a steerable wheel for transmission between longitudinal motion of the piston and swinging motion of the steerable wheel;
   a communicating passage;
   a first valve disposed between the first hydraulic chamber and the communicating passage for fluid communication therebetween during hydraulic pressure in the first hydraulic chamber being greater than or equal to a predetermined threshold pressure and during displacement of the piston being greater than or equal to a predetermined threshold distance in a direction to decrease volumetric capacity of the first hydraulic chamber; and
   a second valve disposed between the second hydraulic chamber and the communicating passage for fluid communication therebetween during hydraulic pressure in the second hydraulic chamber being greater than or equal to a predetermined threshold pressure and during displacement of the piston being greater than or equal to a predetermined threshold distance in a direction to decrease volumetric capacity of the second hydraulic chamber.

2. The integral power steering apparatus as claimed in claim 1, wherein the housing comprises:
   a valve housing accommodating the control valve; and
   a steering housing comprising:
      a bottom section; and
      a cylinder section having one longitudinal end blocked with the valve housing and another longitudinal end blocked with the bottom section.

3. The integral power steering apparatus as claimed in claim 2, wherein the first valve is located in the bottom section of the steering housing.

4. The integral power steering apparatus as claimed in claim 2, wherein the second valve is located in the valve housing.

5. The integral power steering apparatus as claimed in claim 4, wherein the second valve includes a longitudinal axis inclined with reference to a longitudinal axis of the input shaft.

6. The integral power steering apparatus as claimed in claim 1, wherein the second motion transmission mechanism comprises:

a rack coupled to the piston for motion therewith; and a sector gear meshed with the rack and associated with the steerable wheel for transmission between motion of the rack and swinging motion of the steerable wheel.

7. The integral power steering apparatus as claimed in claim 6, wherein the second hydraulic chamber comprises a piston-side partial hydraulic chamber facing the piston and a gear chamber accommodating the sector gear.

8. The integral power steering apparatus as claimed in claim 7, wherein the second valve is facing the gear chamber.

9. The integral power steering apparatus as claimed in claim 1, wherein the first valve and the second valve each comprise:
   a valve body attached to a wall of the housing and having a portion defining a bore facing an associated one of the two hydraulic chambers and a portion defining a valve seat;
   a plunger slidably fitted within the bore of the valve body and having a portion defining a valve portion;
   a spring disposed in the bore of the valve body and biasing the plunger toward the valve seat; and
   the valve portion of the plunger and the valve seat of the valve body having a state of being in contact with each other for fluid separation and a state of being out of contact with each other for fluid communication between the communicating passage and the associated hydraulic chamber.

10. The integral power steering apparatus as claimed in claim 9, wherein the plunger of the first valve has a contact portion for being in contact with the piston to be forced to travel in a direction opposite to the bias of the spring and to open the first valve.

11. The integral power steering apparatus as claimed in claim 10, wherein the plunger of the first valve comprises:
    a plunger main body; and
    a spring pin slidably fitted within the plunger main body and having the contact portion, for adjusting a relative distance between the piston and the contact portion.

12. The integral power steering apparatus as claimed in claim 9, wherein the plunger of the second valve has a contact portion for being in contact with the piston to be forced to travel in a direction opposite to the bias of the spring and to open the second valve.

13. The integral power steering apparatus as claimed in claim 12, wherein the plunger of the second valve comprises:
    a plunger main body; and
    a spring pin slidably fitted within the plunger main body and having the contact portion, for adjusting a relative distance between the piston and the contact portion.

14. The integral power steering apparatus as claimed in claim 9, wherein:
    the second motion transmission mechanism comprises:
      a rack coupled to the piston for motion therewith; and
      a sector gear meshed with the rack and engaged with the steerable wheel for transmission between motion of the rack and swinging motion of the steerable wheel;
    the second hydraulic chamber comprises a piston-side partial hydraulic chamber facing the piston and a gear chamber accommodating the sector gear;
    the second valve is facing the gear chamber; and
    the plunger of the second valve has a contact portion for being in contact with the sector gear to be forced to travel in a direction opposite to the bias of the spring and to open the second valve.

15. The integral power steering apparatus as claimed in claim 14, wherein the plunger of the second valve comprises:
    a plunger main body; and
    a spring pin slidably fitted within the plunger main body and having the contact portion, for adjusting a relative distance between the sector gear and the contact portion.

16. An integral power steering apparatus comprising:
    a housing;
    an input shaft for being connected to a steering wheel for rotation therewith;
    a worm shaft;
    a torsion bar coupling the input shaft and the worm shaft;
    a piston disposed for longitudinal motion between the worm shaft and a wall of the housing and defining a pair of hydraulic chambers including a first hydraulic chamber and a second hydraulic chamber in cooperation with the housing, the second hydraulic chamber being on one side of the piston and closer to the input shaft, and the first hydraulic chamber being on the other side of the piston;
    a recirculating-ball mechanism coupling the worm shaft and the piston for conversion between rotary motion of the worm shaft and longitudinal motion of the piston;
    a pair of fluid passages including a first fluid passage in fluid communication with the first hydraulic chamber and a second fluid passage in fluid communication with the second hydraulic chamber;
    a control valve disposed between a hydraulic pressure source and the pair of fluid passages for variably regulating fluid flow to each of the first fluid passage and the second fluid passage in accordance with torsion of the torsion bar defined by relative angular displacement between the input shaft and the worm shaft;
    a second motion transmission mechanism coupling the piston and a steerable wheel for transmission between longitudinal motion of the piston and swinging motion of the steerable wheel;
    a communicating passage;
    a first valve disposed between the first hydraulic chamber and the communicating passage for fluid communication therebetween during hydraulic pressure in the first hydraulic chamber being greater than or equal to a predetermined threshold pressure and during displacement of the piston being greater than or equal to a predetermined threshold distance in a direction to decrease volumetric capacity of the first hydraulic chamber; and
    a second valve disposed between the second hydraulic chamber and the communicating passage for fluid communication therebetween during hydraulic pressure in the second hydraulic chamber being greater than or equal to a predetermined threshold pressure and during displacement of the piston being greater than or equal to a predetermined threshold distance in a direction to decrease volumetric capacity of the second hydraulic chamber.

17. An integral power steering apparatus comprising:
    a housing;
    input means for rotating with a steering wheel;
    division means for longitudinally moving in the housing and defining a pair of hydraulic chambers including a first hydraulic chamber and a second hydraulic chamber in cooperation with the housing;

first motion transmission means for transmitting between rotary motion of the input means and longitudinal motion of the division means;

pressure control means for variably regulating hydraulic pressure in each of the first hydraulic chamber and the second hydraulic chamber;

second motion transmission means for transmitting between longitudinal motion of the division means and swinging motion of a steerable wheel;

communicating means for providing fluid communication;

first valving means for providing fluid communication between the first hydraulic chamber and the communicating means during hydraulic pressure in the first hydraulic chamber being greater than or equal to a predetermined threshold pressure and during displacement of the piston being greater than or equal to a predetermined threshold distance in a direction to decrease volumetric capacity of the first hydraulic chamber; and second valving means for fluid communication between the second hydraulic chamber and the communicating means during hydraulic pressure in the second hydraulic chamber being greater than or equal to a predetermined threshold pressure and during displacement of the piston being greater than or equal to a predetermined threshold distance in a direction to decrease volumetric capacity of the second hydraulic chamber.

* * * * *